(12) United States Patent
Huang et al.

(10) Patent No.: US 10,817,281 B2
(45) Date of Patent: Oct. 27, 2020

(54) PACKAGED APPLICATION RESOURCES FOR MOBILE APPLICATIONS

(71) Applicant: SAP SE, Walldorf (DE)

(72) Inventors: Rita Huang, Vancouver (CA); Nathan Wang, Coquitlam (CA); Ka Wing Hui, Vancouver (CA); Pak Man Chan, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/174,025

(22) Filed: Oct. 29, 2018

(65) Prior Publication Data

US 2020/0133659 A1    Apr. 30, 2020

(51) Int. Cl.
*G06F 8/71* (2018.01)
*G06F 9/50* (2006.01)
*G06F 8/65* (2018.01)

(52) U.S. Cl.
CPC .................. *G06F 8/71* (2013.01); *G06F 8/65* (2013.01); *G06F 9/5011* (2013.01)

(58) Field of Classification Search
CPC ..... G06F 8/60; G06F 8/61; G06F 8/65; G06F 8/70; G06F 8/71; G06F 9/5011
USPC .................................................. 717/168–178
See application file for complete search history.

(56) References Cited

U.S. PATENT DOCUMENTS

| | | | | |
|---|---|---|---|---|
| 6,070,176 A * | 5/2000 | Downs | .................. | G06F 16/338 715/234 |
| 6,802,061 B1 * | 10/2004 | Parthasarathy | ........... | G06F 8/61 717/120 |
| 6,983,315 B1 * | 1/2006 | Crutcher | ................. | H04L 67/02 709/220 |
| 7,406,664 B1 * | 7/2008 | Morton | .................... | G06F 9/451 715/809 |
| 7,415,706 B1 * | 8/2008 | Raju | .................... | G06F 9/44536 717/170 |
| 7,493,613 B2 * | 2/2009 | D'Souza | ................. | G06F 9/485 717/173 |
| 9,213,536 B2 * | 12/2015 | Ocher | ........................ | G06F 8/65 |
| 9,280,338 B1 * | 3/2016 | Stickle | ................ | G06F 9/44536 |
| 9,733,919 B2 * | 8/2017 | Aleksandrov | ............. | G06F 8/65 |
| 9,952,856 B2 * | 4/2018 | Wetzold | .................... | G06F 8/71 |
| 10,079,832 B1 * | 9/2018 | Dearment | ............... | H04L 63/10 |
| 10,101,993 B2 * | 10/2018 | Siegmund | ................ | G06F 8/65 |

(Continued)

*Primary Examiner* — Andrew M. Lyons
(74) *Attorney, Agent, or Firm* — Fountainhead Law Group P.C.

(57) ABSTRACT

Some embodiments provide a program. The program receives through an application operating on the mobile device a request for a set of visualizations of data. The program further determines a version of application resources to use for generating the set of visualizations of data. Based on the version of application resources, the program also determines whether a set of application resources having the version is included in the application. Upon determining that the set of application resources having the version is included in the application, the program further uses the set of application resources to generate the set of visualizations of data. Upon determining that the set of application resources having the version is not included in the application; the program also retrieves the set of application resources from a computing system and using the retrieved set of application resources to generate the set of visualizations of data.

20 Claims, 8 Drawing Sheets

(56) References Cited

U.S. PATENT DOCUMENTS

| | | | |
|---|---|---|---|
| 10,528,741 B1* | 1/2020 | Collins | G06F 8/70 |
| 2004/0003389 A1* | 1/2004 | Reynar | G06F 8/65 |
| | | | 717/178 |
| 2007/0169101 A1* | 7/2007 | Konersmann | G06F 8/65 |
| | | | 717/170 |
| 2008/0268828 A1* | 10/2008 | Nagaraja | G06F 9/505 |
| | | | 455/419 |
| 2009/0063584 A1* | 3/2009 | Abzarian | G06F 8/71 |
| 2009/0300093 A1* | 12/2009 | Griffiths | G06F 9/5055 |
| | | | 709/202 |
| 2010/0235829 A1* | 9/2010 | Shukla | H04L 67/34 |
| | | | 717/177 |
| 2011/0055683 A1* | 3/2011 | Jiang | G06F 16/957 |
| | | | 715/234 |
| 2012/0047029 A1* | 2/2012 | Veres | G06Q 30/02 |
| | | | 705/14.73 |
| 2012/0084833 A1* | 4/2012 | Thomas | G06F 21/128 |
| | | | 726/3 |
| 2013/0067503 A1* | 3/2013 | Turski | G06F 9/54 |
| | | | 719/330 |
| 2013/0104114 A1* | 4/2013 | Reiss | G06F 8/38 |
| | | | 717/170 |
| 2013/0311613 A1* | 11/2013 | Aleksandrov | G06F 8/65 |
| | | | 709/219 |
| 2014/0081903 A1* | 3/2014 | Koosel | G06F 16/254 |
| | | | 707/602 |
| 2014/0357357 A1* | 12/2014 | Boyd | A63F 13/77 |
| | | | 463/31 |
| 2016/0092204 A1* | 3/2016 | Katkere | G06F 9/44526 |
| | | | 717/170 |
| 2016/0179838 A1* | 6/2016 | Mavinakuli | G06F 16/275 |
| | | | 707/618 |
| 2016/0232010 A1* | 8/2016 | Dicks | G06F 8/654 |
| 2016/0301766 A1* | 10/2016 | Ionescu | G06F 16/172 |
| 2016/0378440 A1* | 12/2016 | Magidson | G06F 8/71 |
| | | | 717/140 |
| 2017/0187838 A1* | 6/2017 | Sankaranarasimhan | G06F 8/34 |
| 2017/0358051 A1* | 12/2017 | Heynen | G06T 1/20 |
| 2018/0157479 A1* | 6/2018 | Zhou | G06F 8/65 |
| 2018/0196665 A1* | 7/2018 | Yao | G06F 9/44521 |
| 2018/0212943 A1* | 7/2018 | Ochs | G06F 16/951 |
| 2018/0217829 A1* | 8/2018 | Mowatt | G06F 9/451 |
| 2018/0247654 A1* | 8/2018 | Bhaya | G10L 15/265 |
| 2019/0087166 A1* | 3/2019 | Plache | G06F 8/61 |
| 2019/0111340 A1* | 4/2019 | Sung | G06Q 30/02 |
| 2019/0146771 A1* | 5/2019 | Voth | G06F 8/65 |
| | | | 717/173 |

* cited by examiner

PACKAGED APPLICATION RESOURCES FOR MOBILE APPLICATIONS

BACKGROUND

For mobile devices, some applications may come pre-installed on the mobile devices, such as first-party applications, web browsers, configuration and/or settings tools, etc. To install other applications, a user of a mobile device can access a mobile application distribution platform or service to browse, select, and download applications to the mobile device, which can then be installed on the mobile device. Often, developers of a mobile application make changes to the mobile application in order to add new features, fix bugs, etc. When a user of a mobile device starts a mobile application that is out-of-date, the user may be prompted to update the mobile application with the most recent version before the user can use the mobile application. So the user has to download the latest version onto the mobile device and then install the mobile application before then user can use it. In some instances, the user may continue using the out-of-date version of the mobile application, but the user may experience crashes, incorrect functionality, or non-working features.

SUMMARY

In some embodiments, a non-transitory machine-readable medium stores a program. The program receives through an application operating on the mobile device a request for a set of visualizations of data. The program further determines a version of application resources to use for generating the set of visualizations of data. Based on the version of application resources, the program also determines whether a set of application resources having the version is included in the application. Upon determining that the set of application resources having the version is included in the application, the program further uses the set of application resources to generate the set of visualizations of data. Upon determining that the set of application resources having the version is not included in the application; the program also retrieves the set of application resources from a computing system and using the retrieved set of application resources to generate the set of visualizations of data.

In some embodiments, the application may be a first application and the computing system may be a first computing system. Determining the version of application resources may include sending a second computing system a request for the version the application resources and receiving the version of the application resources from the second computing system. The second computing system may include a second application and application resources having the version that are configured to generate visualizations of data on a client computing device accessing the second application through a web browser operating on the client computing device. Determining that the set of application resources having the version is included with the application may include selecting the set of application resources from a plurality of sets of application resources included with the application. Each set of application resources in the plurality of sets of application resources may have a different version.

In some embodiments, the set of visualizations of data may be defined as a collection of visualizations of data. Receiving the request for the set of visualizations of data may include receiving a selection of a UI element provided by the application. The UI element may represent the defined collection of visualizations of data. The program may further receive a request for the set of application resources from a webview object. Determining the version of application resources may be performed in response to receiving the request for the set of application resources from the webview object. The computing system may be a first computing system. Generating a visualization of data in the set of visualizations of data may include the webview object sending a second computing system a request for data for the visualization of data, receiving the data from the computing system, and generating the visualization of data based on the received data. The request for the set of visualizations of data may be the first request received through the application after the application is started.

In some embodiments, method, executable by a mobile device, receives through an application operating on the mobile device a request for a set of visualizations of data. The method further determines a version of application resources to use for generating the set of visualizations of data. Based on the version of application resources, the method also determines whether a set of application resources having the version is included in the application. Upon determining that the set of application resources having the version is included in the application, the method further uses the set of application resources to generate the set of visualizations of data. Upon determining that the set of application resources having the version is not included in the application; the method further retrieves the set of application resources from a computing system and using the retrieved set of application resources to generate the set of visualizations of data.

In some embodiments, the application may be a first application and the computing system may be a first computing system. Determining the version of application resources may include sending a second computing system a request for the version the application resources and receiving the version of the application resources from the second computing system. The second computing system may include a second application and application resources having the version that are configured to generate visualizations of data on a client computing device accessing the second application through a web browser operating on the client computing device. Determining that the set of application resources having the version is included with the application may include selecting the set of application resources from a plurality of sets of application resources included with the application. Each set of application resources in the plurality of sets of application resources may have a different version.

In some embodiments, the set of visualizations of data may be defined as a collection of visualizations of data. Receiving the request for the set of visualizations of data may include receiving a selection of a UI element provided by the application. The UI element may represent the defined collection of visualizations of data. The method may further receive a request for the set of application resources from a webview object. Determining the version of application resources may be performed in response to receiving the request for the set of application resources from the webview object. The computing system may be a first computing system. Generating a visualization of data in the set of visualizations of data may include the webview object sending a second computing system a request for the visualization of data, receiving the data from the computing system, and generating the visualization of data based on the received data. The request for the set of visualizations of data may be the first request received through the application after the application is started.

In some embodiments, a mobile system includes a set of processing units and a non-transitory machine-readable medium storing instructions. The instructions cause at least one processing unit to receive through an application operating on the mobile system a request for a set of visualizations of data. The instructions further cause the at least one processing unit to determine a version of application resources to use for generating the set of visualizations of data. Based on the version of application resources, the instructions also cause the at least one processing unit to determine whether a set of application resources having the version is included in the application. Upon determining that the set of application resources having the version is included in the application, the instructions further cause the at least one processing unit to use the set of application resources to generate the set of visualizations of data. Upon determining that the set of application resources having the version is not included in the application; the instructions also cause the at least one processing unit to retrieve the set of application resources from a computing system and use the retrieved set of application resources to generate the set of visualizations of data.

In some embodiments, the application may be a first application and the computing system may be a first computing system. Determining the version of application resources may include sending a second computing system a request for the version the application resources and receiving the version of the application resources from the second computing system. The second computing system may include a second application and application resources having the version that are configured to generate visualizations of data on a client computing device accessing the second application through a web browser operating on the client computing device. Determining that the set of application resources having the version is included with the application may include selecting the set of application resources from a plurality of sets of application resources included with the application. Each set of application resources in the plurality of sets of application resources may have a different version.

In some embodiments, the set of visualizations of data may be defined as a collection of visualizations of data. Receiving the request for the set of visualizations of data may include receiving a selection of a UI element provided by the application. The UI element may represent the defined collection of visualizations of data. The instructions may further cause the at least one processing unit to receive a request for the set of application resources from a webview object. Determining the version of application resources may be performed in response to receiving the request for the set of application resources from the webview object. The computing system may be a first computing system. Generating a visualization of data in the set of visualizations of data may include the webview object sending a second computing system a request for data for the visualization of data. receiving the data from the computing system, and generating the visualization of data based on the received data.

The following detailed description and accompanying drawings provide a better understanding of the nature and advantages of the present invention.

DETAILED DESCRIPTION

Figure 1:
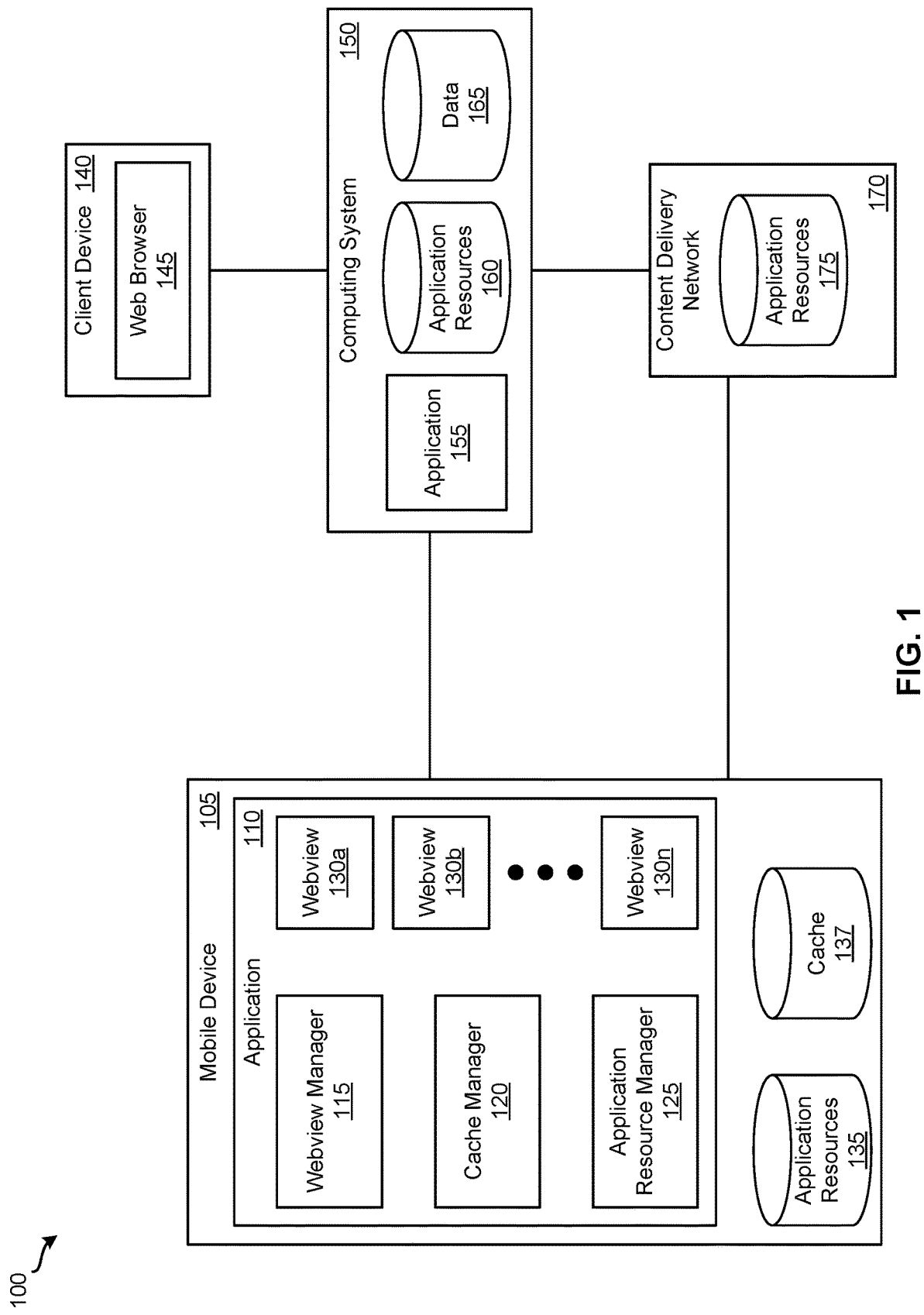
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for using application resources packaged with mobile applications. In some embodiments, an application packaged with several different versions of application resources is installed on a mobile device. When the application is started on the mobile device and a collection of visualizations of data is selected, the application mobile device sends a computing system (e.g., a computing system in a cloud computing system) a request for the version of application resources to use for generating visualizations of data. Once the application receives the desired version of application resources from the computing system, the application checks whether application resources included in the application have the same version. If so, the application uses the application resources included in the application with the same version to generation the collection of visualizations of data. If not, the application downloads the desired version of the application resources from another computing system (e.g. a computing system in a content distribution network) and uses the downloaded application resources to generate the collection of visualizations of data.

In some instances where the application does not have the same version as the version of application resources being used, the application may use a different version of application resources that are included in the application. For example, a version of application resources may be designated using a major number, a minor number, and a revision number. In some embodiments, the application can use a version of application resources that has the same major number, the same minor number, but a different revision number as the version of application resources being used. In such cases, the application may temporarily use such a version of application resources to generate visualizations of data while also downloading the version of application resources being used in the background. Once the version of application resources being used is downloaded, they can be used the next time the application starts or is brought from the background into the foreground.

The techniques described herein provide a number of benefits and advantages over conventional usage of application resources in mobile applications. First, by packaging several different versions of application resources with the application, the application is able to provide visualizations of data faster and with less delay. For instance, when the application is started and the application is loading a collection of visualizations of data, the application does not have to wait to download the desired version of application resources because the version of application resources are already packaged in the application and, thus, available locally. Second, using a different version of application resources to generate visualizations of data while simultaneously downloading the desired version of application resources also allows the application to provide visualizations of data faster and with less delay. The application can use a different, but working, version of application resources to generate visualizations of data instead of waiting to download the desired version of application resources.

FIG. 1 illustrates a system 100 according to some embodiments. As shown, system 100 includes mobile device 105, client device 140, computing system 150 and content delivery network 170. Although FIG. 1 shows one mobile device 105, one client device 140, one of ordinary skill in the art will appreciate that any number of additional mobile devices configured similarly to mobile device 105 and/or client devices configured similarly to client device 140 may be included in system 100.

As illustrated in FIG. 1, client device 140 includes web browser 145. Client device 140 is configured to communicate and interact with computer system 150. For example, a user of client device 140 may log onto and access application 155 hosted on computing system 150 via web browser 145. In response to the logon, client device 140 may receive from computing system 150, via web browser 145, application resources stored in application resources 160 to use for generating visualizations of data (e.g., chart visualizations such as bar charts, pie charts, line charts, scatter charts, etc.). While using application 155 via web browser 145, the user may want to view visualizations of data (e.g., data stored in data storage 165), for example, by selecting a collection of visualizations of data. In response, client device 140 executes the application resources in order to retrieve data from data storage 165 for the desired visualizations of data, generate the visualizations of data, and then display (e.g., on a display of client device 140) them on client device 140.

As shown, mobile device 105 includes application 110, application resources storage 135, and cache storage 137. Application resources storage 135 is configured to store one or more versions of application resources. In some embodiments, an application resource may be a static image to be included in visualizations of data or a Javascript file configured to generate, or facilitate the generation of, visualizations of data. In some such embodiments, a version of application resources includes a set of static images to be included in visualizations of data and a set of Javascript files to generate, or facilitate the generation of, visualizations of data. The application resources stored in application resources storage 135 may be application resources packaged with application 110 when mobile device 105 downloaded application 110 (e.g., from a mobile application distribution platform). In some cases, when mobile device 105 installed the downloaded application 110, mobile device stored the application resources packaged with application 110 in application resources storage 135. Cache storage 137 is configured to store one or more versions of application resources that were not packaged with application 110, but were instead downloaded from content delivery network 170. In some embodiments, application resources storage 135 and cache storage 137 are implemented in a single physical storage while, in other embodiments, application resources storage 135 and cache storage 137 may be implemented across several physical storages. While FIG. 1 shows application resources storage 135 and cache storage 137 as external to application 110, one of ordinary skill in the art will appreciate that application resources storage 135 and/or cache storage 137 may be part of application 110 in some embodiments. Similarly, one of ordinary skill in the art will realize that application resources storage 135 and/or cache storage 137 may be external to mobile device 105 in some embodiments.

As illustrated in FIG. 1, application 110 includes webview manager 115, cache manager 120, application resource manager 125, and webviews 130a-n. In some embodiments, a webview 130 is an object configured to display web content. Webviews 130a-n may also be referred to as webview objects. In order to generate visualizations of data, a webview 130 may need application resources so the webview 130 may send cache manager 120 a request for application resources. When the webview 130 receives the application resources from cache manager 120, the webview 130 can execute the application resources in order to generate visualizations of data. In some embodiments, executing the application resources includes sending computing system 150 a request for data for the visualization of data. When the requested data is received from computing system 150, the webview 130 uses the data to generate the visualization of data.

Webview manager 115 is configured to manage webviews 130a-n. For example, when application 110 is started, webview manager 115 generates webviews 130a-n. Webview manager 115 may receive a request from application 110 to generate visualizations of data. In response, webview manager 115 instructs webviews 130a-n to generate the requested visualizations of data. In some embodiments, a particular webview 130 is able to generate one visualization of data at a time. In some such embodiments, webview manager 115 instructs each webview 130 to generate a visualization of data. When a webview 130 is finished with generating a visualization of data, webview manager 115 instructs the webview 130 to generate another visualization of data, if any are not yet generated.

Webview manager 115 also handles the destruction of webviews 130a-n. For instance, if application 110 is placed in the background, webview manager 115 destroys webviews 130a-n. Also, webview manager 115 destroys webviews 130a-n as part of the shutdown process when application 110 is closed. In some embodiments, application 110 provides an option (e.g., a clear storage option) that, when selected, causes the destruction of webviews 130a-n.

Cache manager 120 is responsible for processing requests for application resources. For instance, cache manager 120 can receive a request from a webview 130 for application resources. In response to such a request, cache manager 120 forwards the request to application resource manager 125. In response to the request, if cache manager 120 receives application resources from application resource manager 125, cache manager 120 forwards them to the webview 130. Cache manager 120 may also store the application resources in cache storage 137 for later use (e.g., another webview 130 request application resources having the same version). In some instances, instead of receiving application resources from application resource manager 125, cache manager 120 receives from application resource manager 125 a notification indicating that there are no application resources that can be used. In some such instances, cache manager 120 accesses a storage (not shown), such as a user session storage configured to store the version (e.g., a version with a particular major number, minor number, and revision number) of application resources to use, and retrieves the version of application resources to use. Then, cache manager 120 checks cache storage 137 for application resources having this version of application resources. If no such application resources are available in cache storage 137, cache manager 120 sends application resource manager 125 a request to download the desired version of application resources. When cache manager 120 receives the application resources from application resource manager 125, cache manager 120 forwards them to the webview 130. Cache manager 120 can also store the application resources in cache storage 137 for later use (e.g., another webview 130 request application resources having the same version).

In some embodiments, instead of forwarding the request from the webview 130 to application resource manager 125, cache manager 120 accesses a storage (e.g., a user session storage configured to store the version of application resources to use) and retrieves the version of application resources to use. Next, cache manager 120 checks cache storage 137 for application resources having this version of application resources. If no such application resources are available in cache storage 137, cache manager 120 then sends application resource manager 125 a request to download the desired version of application resources. Upon receiving the application resources from application resource manager 125, cache manager 120 forwards them to the webview 130. Cache manager 120 may also store the application resources in cache storage 137 for later use (e.g., another webview 130 request application resources having the same version).

Application resource manager 125 is configured to manage application resources. For example, application resource manager 125 may receive a request from cache manager 120 for application resources. In response, application resource manager 125 sends computing system 150 a request for a version of application resources that computing system 150 is using (e.g., that computing system 150 sends to client device 140 for client device 140 to generate visualizations of data). In return, application resource manager 125 receives the version (e.g., a version with a particular major number, minor number, and revision number) of application resources from computing system 150 and stores the version in a storage (not shown), such as a user session storage configured to store the version of application resources to use. Next, application resource manager 125 accesses application resources storage 135 to check whether the same version of application resources is available in application resources storage 135. If so, application resource manager 125 sends the version of application resources to cache manager 120. In some embodiments where the same version of application resources is not available in application resources storage 135, application resource manager 125 sends computing system 150 a request for the location of the version of application resources being used by computing system 150, uses the location to download the version of application resources from content delivery network 170, and sends them to cache manager 120. Application resource manager 125 may store the downloaded application resources in cache storage 137. In other embodiments where the same version of application resources is not available in application resources storage 135, application resource manager 125 sends cache manager 120 a notification indicating that there are no application resources that can be used. In some such other embodiments, application resource manager 125 may receive a request from cache manager 120 to download the desired version of application resources from content distribution network 170. In response, application resource manager 125 sends computing system 150 a request for the location of the version of application resources being used by computing system 150, uses the location to download the version of application resources from content delivery network 170, and sends them to cache manager 120. Application resource manager 125 can also store the downloaded application resources in cache storage 137.

In some cases where the version of application resources being used by computing system 150 is not available in application resources storage 135, application resource manager 125 may check whether a different, but compatible, version of application resources is available in application resources storage 135. In some embodiments, a version of application resources may be designated using a major number, a minor number, and a revision number. Application resource manager 125 can determine that a version of application resources is different, but compatible, if the version of application resources has the same major number, the same minor number, but a different revision number as the version of application resources being used by computing system 150. If such a version of application resources is available in application resources storage 135, application resource manager 125 sends them to cache manager 120. Then, application resource manager 125 sends computing system 150 a request for the location of the version of application resources being used by computing system 150. Application resource manager 125 uses the location to download (e.g., in a background processing thread executing on mobile device 105) the version of application resources from content delivery network 170 and stores them in cache storage 137 for later use.

As shown in FIG. 1, computing system 150 includes application 155, application resources storage 160, and data storage 165. Application resources storage 160 is configured to store versions of application resources that are configured to generate, or facilitate the generation of, visualizations of data. For instance, each time a new version of application resources is generated (e.g., by computing system 150 of another system such as a build system), computing system stores the new version of application resources in application resources storage 160. Data storage 165 is configured to store set of data that are used for visualizations of data. In addition, data storage 165 stores definitions of collections of visualizations of data. In some embodiments, a definition of a collection of visualizations of data specifies a set of visualization definitions. Each visualization definition in the set of visualization definitions specifies a type of visualization, data for the visualization, filters for the visualization, metadata describing the visualization, etc. In some embodiments, application resources storage 160 and data storage 165 are implemented in a single physical storage while, in other embodiments, application resources storage 160 and data storage 165 may be implemented across several physical storages. While FIG. 1 shows application resources storage 160 and data storage 165 as part of computing system 150, one of ordinary skill in the art will understand that application resources storage 160 and/or data storage 165 may be external to computing system 150 in some embodiments.

Application 155 may be a software application operating on (e.g., hosted on) computing system 150 that may be accessed by mobile device 105 and client device 140. Application 155 may be any number of different types of applications. For instance, application 155 may be an analytics application, a data management application, a human capital management application, an enterprise management application, a customer relationship management application, a financial management application, etc.

Application 155 can process requests from mobile device 105 and client device 140. For example, application 155 may receive from client device 140 a request for application resources. In response to the request, application 155 retrieves a version of application resources from application resources storage 160 being used by computing system 150 and sends them to client device 140 so client device 140 can use the application resources to generate visualizations of data. As another example, application 155 may receive a request for data for a visualization of data from mobile device 105 or client device 140. In response, application 155 may access data storage 165 to retrieve the requested data and then send the data to mobile device 105 or client device 140.

Content delivery network 170 includes application resources storage 175. Content delivery network 170 may include a set of computing devices (e.g., servers) configured distribute application resources stored in application resources storage 175. In some instances, content delivery network 170 receives application resources from computing system 150. Upon receiving the application resources, content delivery network 170 stores them in application resources storage 175. In other instances, content delivery network 170 can receive from mobile device 105 a request for application resources stored in application resources storage 170. In response to such a request, content delivery network 170 sends the requested application resources to mobile device 110.

Figure 2:
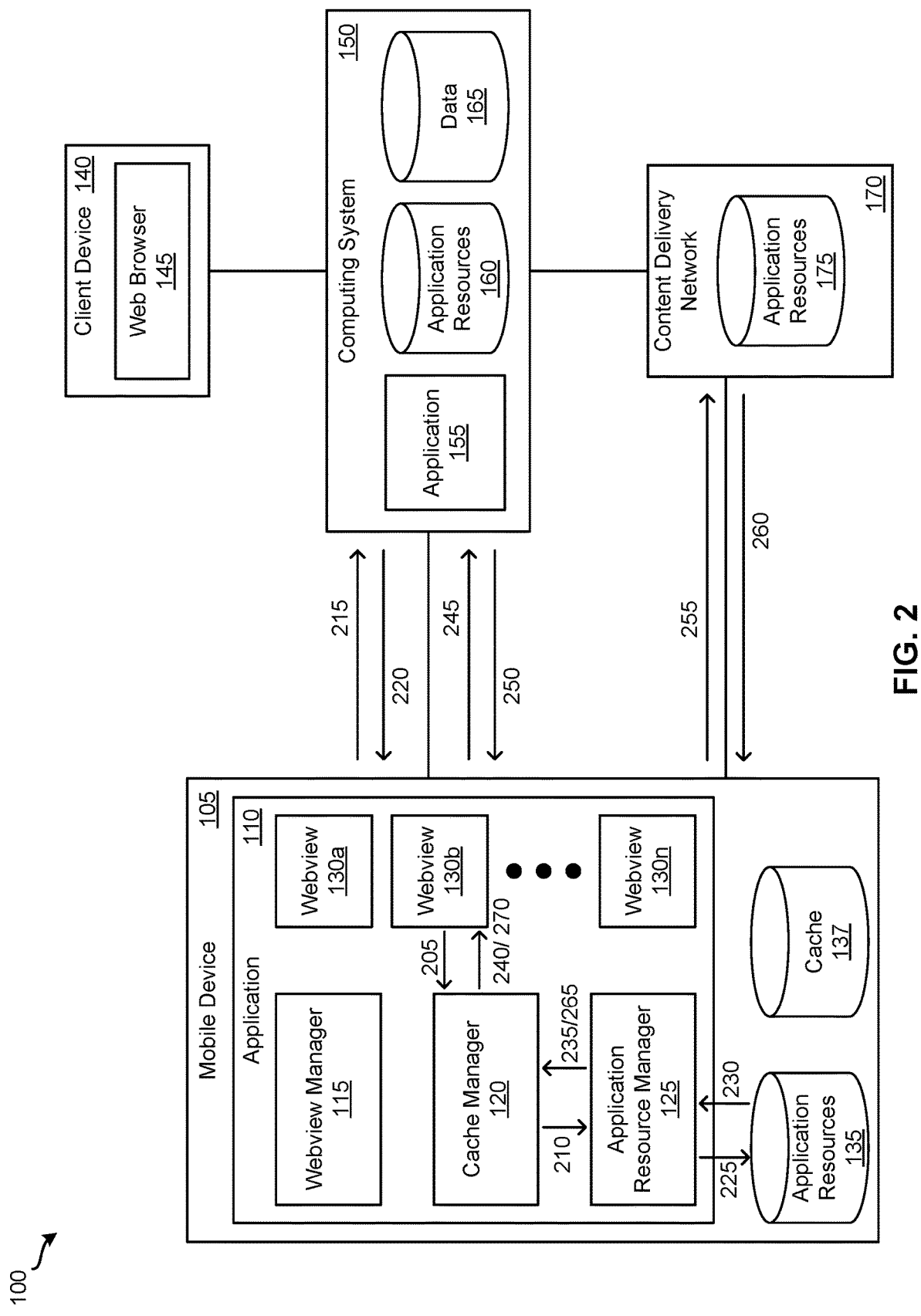
FIG. 2 illustrates a data flow through the system illustrated in FIG. 1 according to some embodiments.

An example operation of system 100 will now be described by reference to FIG. 2. Specifically, the example operation is an example of utilizing application resources packaged in an application according to some embodiments. FIG. 2 illustrates a data flow through system 100 according to some embodiments. For this example operation, application 110 has already been started and is running on mobile device 105. In addition, webview manager 115 generated webviews 130a-n upon the start of application 110. A user of mobile device 105 has selected a collection of visualizations of data to view (e.g., by selecting a user interface (UI) element provided by application 110 that represents the collection of visualizations of data). In response, webview manager 115 has instructed webview 130b (among other webviews 130) to generate a visualization of data in the collection of visualizations of data.

The example operations starts by webview 130b sending, at 205, a request to cache manager 120 for application resources for generating visualizations of data. Upon receiving the request from webview 130b, cache manager 120 forwards, at 210, the request to application resource manager 125. When application resource manager 125 receives the request, application resource manager 125 sends, at 215, computing system 150 a request for a version of application resources that computing system 150 is using (e.g., that computing system 150 sends to client device 140 for client device 140 to generate visualizations of data). In return, computing system 150 sends, at 220, the requested version of application resources to application resource manager 125, which application resource manager 125 stores in a storage, such as a user session storage configured to store the version of application resources to use.

Next, application resource manager 125 accesses, at 225, application resources storage 135 to check whether the same version of application resources is available in application resources storage 135. If so, application resource manager 125 retrieves, at 230, that version of application resources and sends, at 235, them to cache manager 120. Then, cache manager 120 forwards, at 240, the application resources to webview 130b. In some embodiments, in the event that the version of application resources is not available in application resources storage 135, application resource manager 125 sends, at 235, a notification indicating that there are no application resources that can be used. In response to the notification, cache manager 120 sends application resource manager 125 a request to download the desired version of application resources. Then, application resource manager 125 sends, at 245, computing system 150 a request for the location of the version of application resources being used by computing system 150. In return, computing system 150 sends, at 250, the location (e.g., a uniform resource identifier (URI)) of the application resources to application resource manager 125. Next, application resource manager 125 uses the location to access, at 255, content delivery network 170 and download, at 260, the application resources from content delivery network 170. Application resource manager 125 sends, at 265, them to cache manager 120. After receiving the application resources from application resource manager 125, cache manager 120 forwards, at 270, them to webview 130b.

Figure 3:
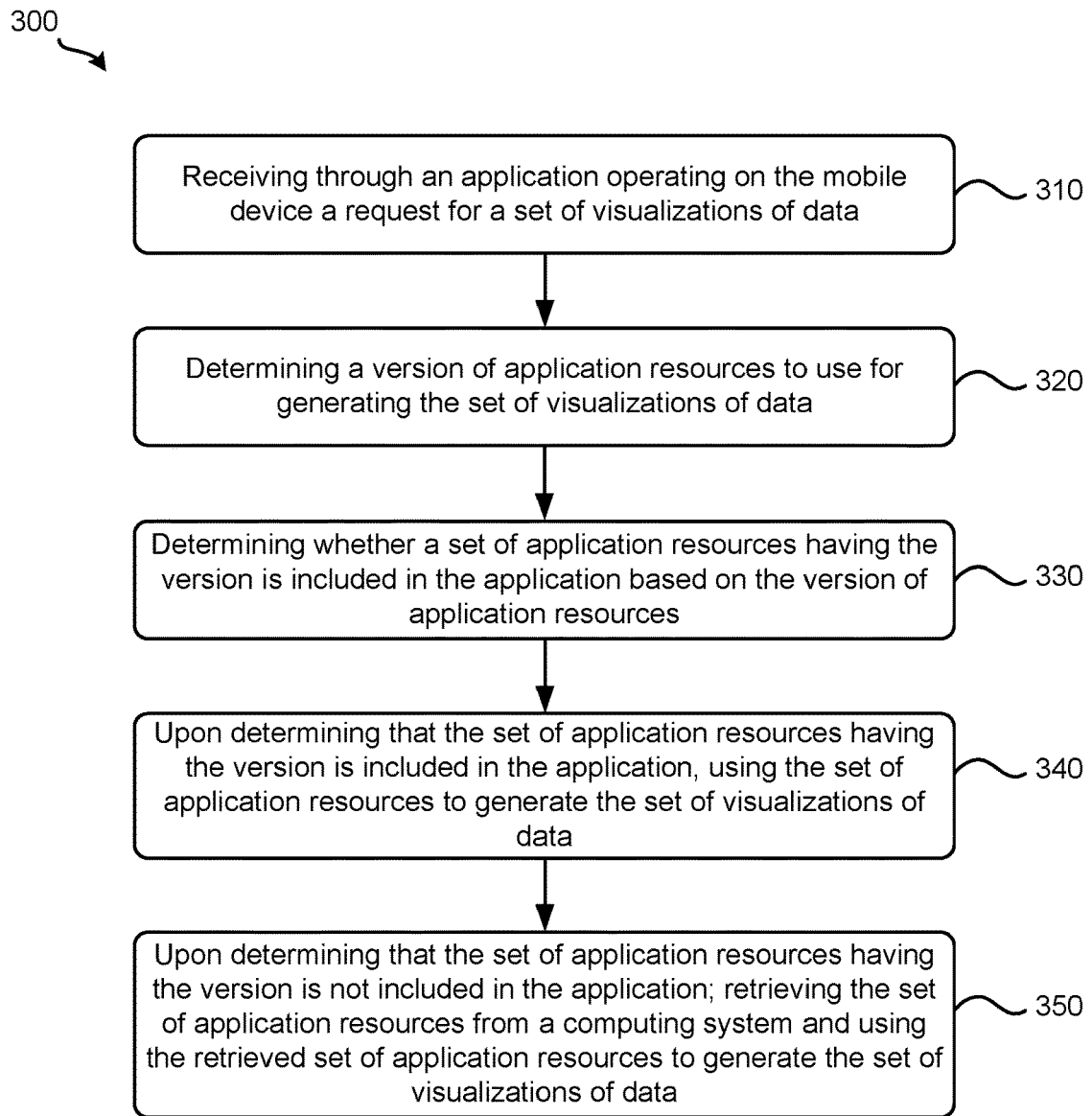
FIG. 3 illustrates a process for utilizing application resources packaged in an application according to some embodiments.

FIG. 3 illustrates a process 300 for utilizing application resources packaged in an application according to some embodiments. In some embodiments, application 110 performs process 300. Process 300 begins by receiving, at 310, through an application operating on the mobile device a request for a set of visualizations of data. Referring to FIG. 1 as an example, application 110 may receive from a user of mobile device 105 a request for a set of visualizations of data. In some cases, the user of mobile device 105 sends the request to application 110 by sending a selection of a UI element provided by application 110 that represents a collection of visualizations of data. In response to the request, webview manager 115 instructs a webview 130 to generate a visualization of data for each visualization of data in the set of visualizations of data.

Next, process 300 determines, at 320, a version of application resources to use for generating the set of visualizations of data. Referring to FIG. 1 as an example, when a webview 130 receives a request to generate a visualization of data, the webview 130 sends cache manager 120 a request for application resources, which cache manager 120 forwards to application resource manager 125. Upon receiving the request, application resource manager 125 determines the version of application resources to use by sending computing system 150 a request for a version of application resources that is being used. Application resource manager 125 then receives the requested version of application resources from computing system 150.

Process 300 then determines, at 330, whether a set of application resources having the version is included in the application based on the version of application resources. Referring to FIG. 1 as an example, application resource manager 125 application resource manager 125 accesses application resources storage 135 and checks whether the same version of application resources is available in application resources storage 135. Upon determining that the set of application resources having the version is included in the application, process 300 uses, at 340, the set of application resources to generate the set of visualizations of data. Referring to FIG. 1 as an example, when the version of application resources is available in application resources storage 135, application resource manager 125 retrieves that version of application resources and sends them to cache manager 120, which forwards the application resources to the webview 130. The webview 130 uses the application resources to generate the visualization of data. The webview 130 can generate the visualization of data by executing the application resources, which may include sending computing system 150 a request for data for the visualization of data, receiving the requested data from computing system 150, and using the data to generate the visualization of data.

Finally, upon determining that the set of application resources having the version is not included in the application; process 300 retrieves, at 350, the set of application resources from a computing system and uses the retrieved set of application resources to generate the set of visualizations of data. Referring to FIG. 1 as an example, when the version of application resources is not available in application resources storage 135, application resource manager 125 sends cache manager 120 a notification indicating that there are no application resources that can be used. In response to the notification, cache manager 120 sends application resource manager 125 a request to download the desired version of application resources. Application resource manager 125 then sends computing system 150 a request for the location of the version of application resources being used by computing system 150. Then, computing system 150 sends the location of the application resources to application resource manager 125. Once application resource manager 125 receives the location from computing system 150, application resource manager 125 uses the location to access content delivery network 170 and download the application resources from content delivery network 170. Cache manager 120 then stores the downloaded application resources in cache storage 137 and sends them to the webview 130. The webview 130 generates the visualization of data in the same or similar manner described above. Next, application resource manager 125 sends the downloaded application resources to cache manager 120, which forwards them to the webview 130.

Figure 4:
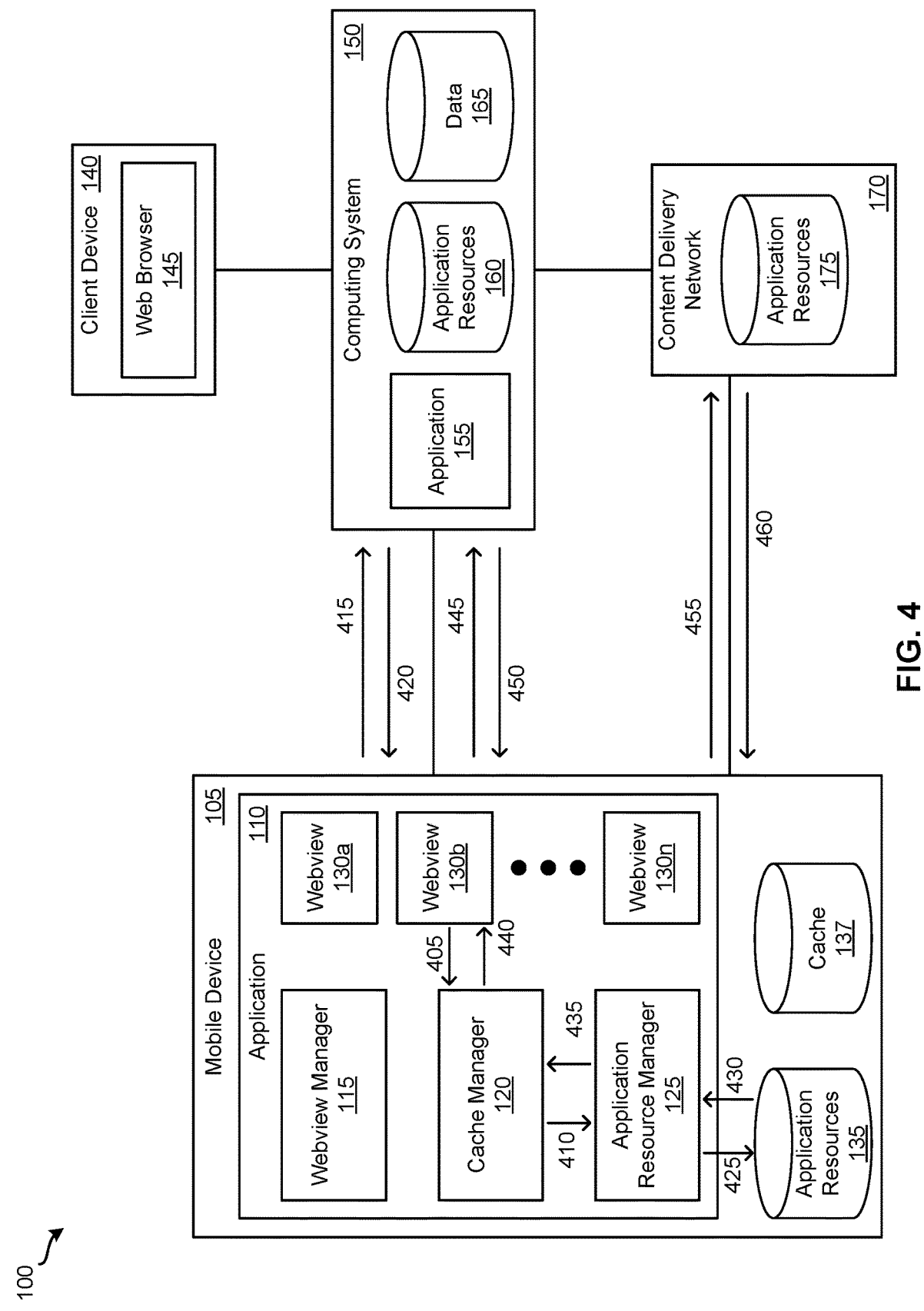
FIG. 4 illustrates another data flow through the system illustrated in FIG. 1 according to some embodiments.

Another example operation of system 100 will now be described by reference to FIG. 4. In particular, the example operation is an example of using a different, compatible version of application resources according to some embodiments. FIG. 4 illustrates another data flow through system 100 according to some embodiments. This example operation is similar to the example operation described above in that application 110 has already been started and is running on mobile device 105 and webview manager 115 generated webviews 130a-n upon the start of application 110. Also, the user of mobile device 105 has selected a collection of visualizations of data to view (e.g., by selecting a user interface (UI) element provided by application 110 that represents the collection of visualizations of data) and, in response, webview manager 115 has instructed webview 130b (among other webviews 130) to generate a visualization of data in the collection of visualizations of data.

This example operations begins by webview 130b sending, at 405, a request to cache manager 120 for application resources for generating visualizations of data. After receiving the request from webview 130b, cache manager 120 forwards, at 410, the request to application resource manager 125. In response to the request, application resource manager 125 sends, at 415, computing system 150 a request for a version of application resources that computing system 150 is using (e.g., that computing system 150 sends to client device 140 for client device 140 to generate visualizations of data). In response, computing system 150 sends, at 420, the requested version of application resources to application resource manager 125.

Then, application resource manager 125 accesses, at 425, application resources storage 135 to check whether the same version of application resources is available in application resources storage 135. In this example, such a version of application resources is not available in application resources storage 135. As mentioned above, application resource manager 125 can determine that a version of application resources is different, but compatible, if the version of application resources has the same major number, the same minor number, but a different revision number as the version of application resources being used by computing system 150. For this example, such a version of application resources is available in application resources storage 135. Therefore, application resource manager 125 retrieves, at 430, this version of application resources from the application resources storage 135 and sends, at 450, them to cache manager 120. Then, cache manager 120 forwards, at 240, the application resources to webview 130b to temporarily use for generating visualizations of data.

After determining that a different, but compatible, version of application resources is available in application resources storage 135, application resource manager 125 also sends, at 445, computing system 150 a request for the location of the version of application resources. In response, computing system 150 sends, at 450, application resource manager 125 the location. In some embodiments, some or call of the application resources are located in different locations. In some such embodiments, computing system 150 sends application resource manager 125 a list of the different locations of the different application resources.

Next, application resource manager 125 uses the location to start downloading, at 455, the application resources from content delivery network 170. In instances where the application resources are located in different locations, application resource manager 125 uses each of the locations to start downloading, at 455, the different application resources from content delivery network 170. Once the application resources are done downloading from content delivery network 170, application resource manager 125 stores them in cache storage 137 for later use. For example, the next time application 110 is started and cache manager 120 receives a request for application resources from a webview 130, cache manager 120 accesses a storage (e.g., a user session storage configured to store the version of application resources to use) and retrieves the version of application resources to use. In this example, the version is that of the downloaded application resources. Thus, cache manager 120 retrieves the downloaded application resources from cache storage 137 and sends them to the webview 130. As another example, when application 110 is placed from the background to the foreground and cache manager 120 receives a request for application resources from a webview 130, cache manager 120 accesses the storage in order to retrieve the version of application resources to use, retrieves the downloaded application resources from cache storage 137, and sends them to the webview 130.

Figure 5:
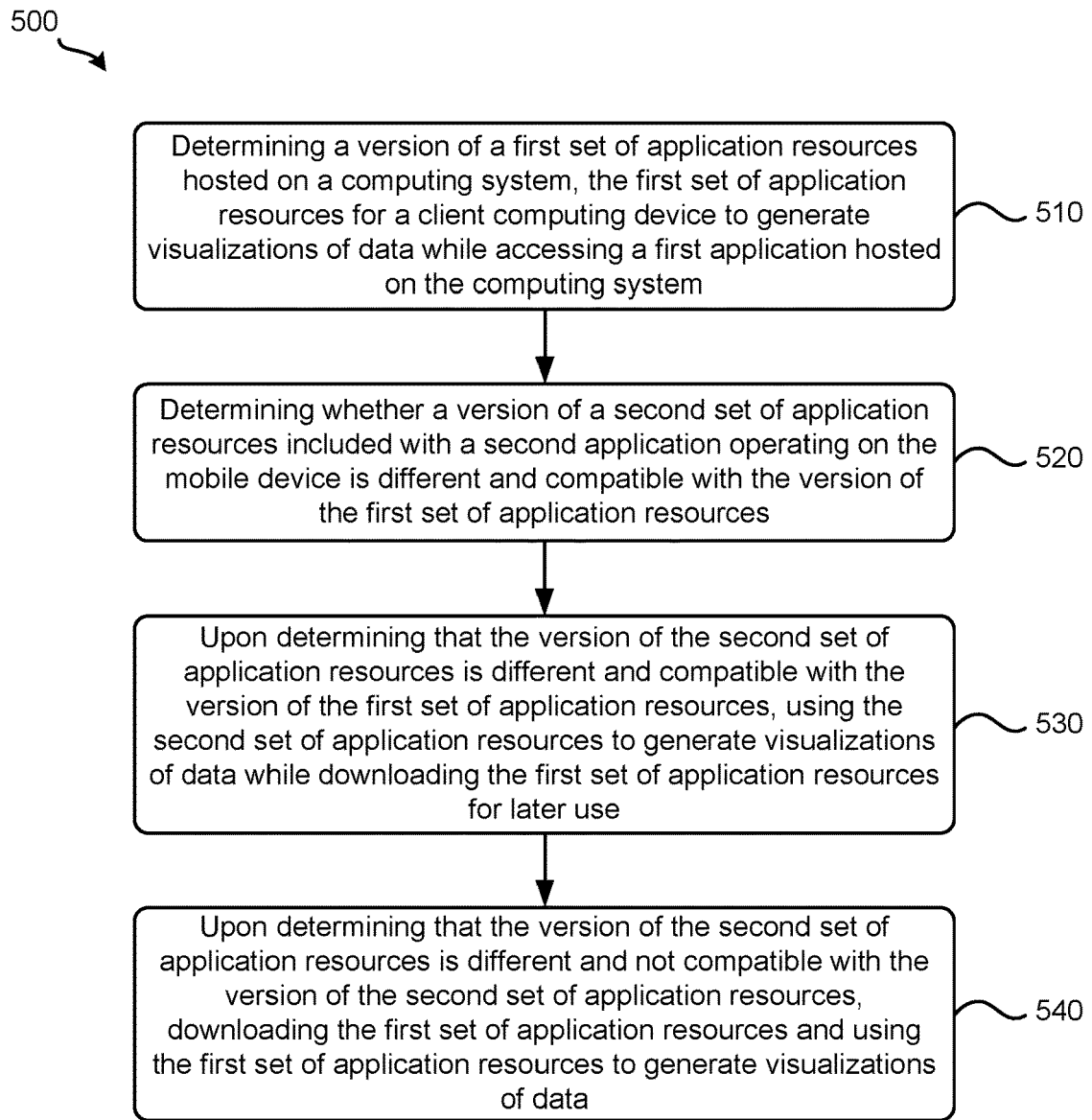
FIG. 5 illustrates a process for using a different, compatible version of application resources according to some embodiments.

FIG. 5 illustrates a process 500 for using a different, compatible version of application resources according to some embodiments. In some embodiments, application 110 performs process 500. Process 500 starts by determining, at 510, a version of a first set of application resources hosted on a computing system, the first set of application resources for a client computing device to generate visualizations of data while accessing a first application hosted on the computing system. Referring to FIG. 1 as an example, application resource manager 125 may determine the version of application resources hosted on computing system 150 that computing system 150 is sending to client device 140 to generate visualizations of data by sending computing system 150 a request for the version and, in return, receiving the version from computing system 150.

Next, process 500 determines, at 520, whether a version of a second set of application resources included with a second application operating on the mobile device is different and compatible with the version of the first set of application resources. Referring to FIG. 1 as an example, application resource manager 125 determines that a version of application resources is different, but compatible, if the version of application resources has the same major number, the same minor number, but a different revision number as the version of application resources being used by computing system 150.

Upon determining that the version of the second set of application resources is different and compatible with the version of the first set of application resources, process 500 uses, at 530, the second set of application resources to generate visualizations of data while downloading the first set of application resources for later use. Referring to FIG. 1 as an example, if application resource manager 125 checks application resource storage 135 and such a version of application resources is available, application resource manager 125 sends them to cache manager 120, which forwards the application resources to the webview 130 that requested the application resources. Application resource manager 125 then sends computing system 150 a request for the location of the version of application resources being used by computing system 150. Application resource manager 125 uses the location to download (e.g., in a background processing thread executing on mobile device 105) the version of application resources from content delivery network 170 and stores them in cache storage 137 for later use. For instance, the downloaded application resources are used the next time application 110 is started, when application 110 is placed from the background to the foreground, or application 110 receives a selection of an option, which is provided by application 110, that causes the destruction of webviews 130a-n.

Finally, upon determining that the version of the second set of application resources is different and not compatible with the version of the second set of application resources, process 500 downloads, at 540, the first set of application resources and uses the first set of application resources to generate visualizations of data. Referring to FIG. 1 as an example, if application resource manager 125 checks application resource storage 135 and such a version of application resources is not available, application resource manager 125 sends computing system 150 a request for the location of the version of application resources being used by computing system 150. Application resource manager 125 uses the location to download (e.g., in a background processing thread executing on mobile device 105) the version of application resources from content delivery network 170 and stores them in cache storage 137. In addition, application resource manager 125 sends the downloaded application resources to cache manager 120, which forwards the application resources to the webview 130 that requested the application resources.

Figure 6:
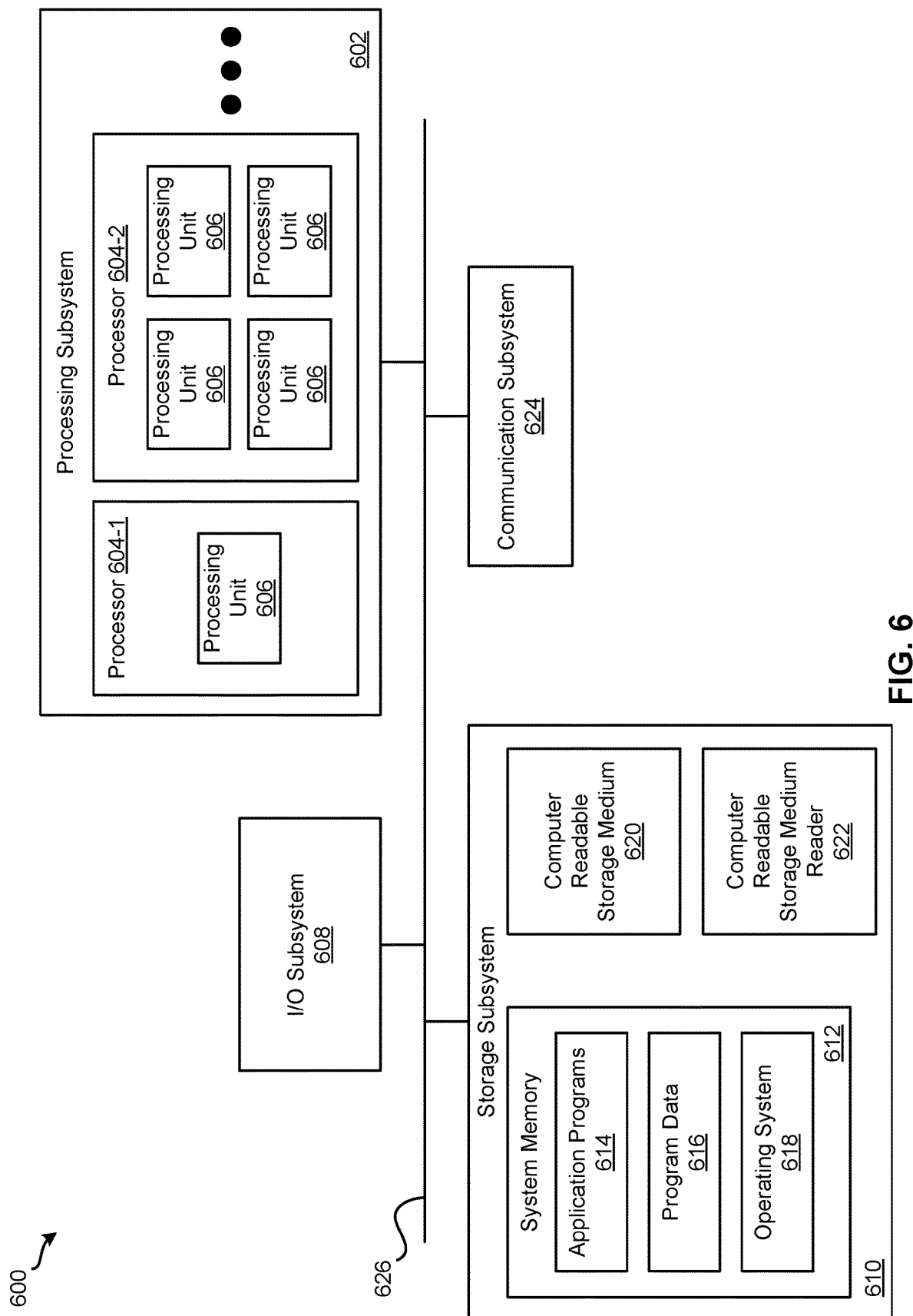
FIG. 6 illustrates an exemplary computer system, in which various embodiments may be implemented.

FIG. 6 illustrates an exemplary computer system 600 for implementing various embodiments described above. For example, computer system 600 may be used to implement client device 140, computing system 150, and content delivery network 170. Computer system 600 may be a desktop computer, a laptop, a server computer, or any other type of computer system or combination thereof. As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 155), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components and/or processes described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
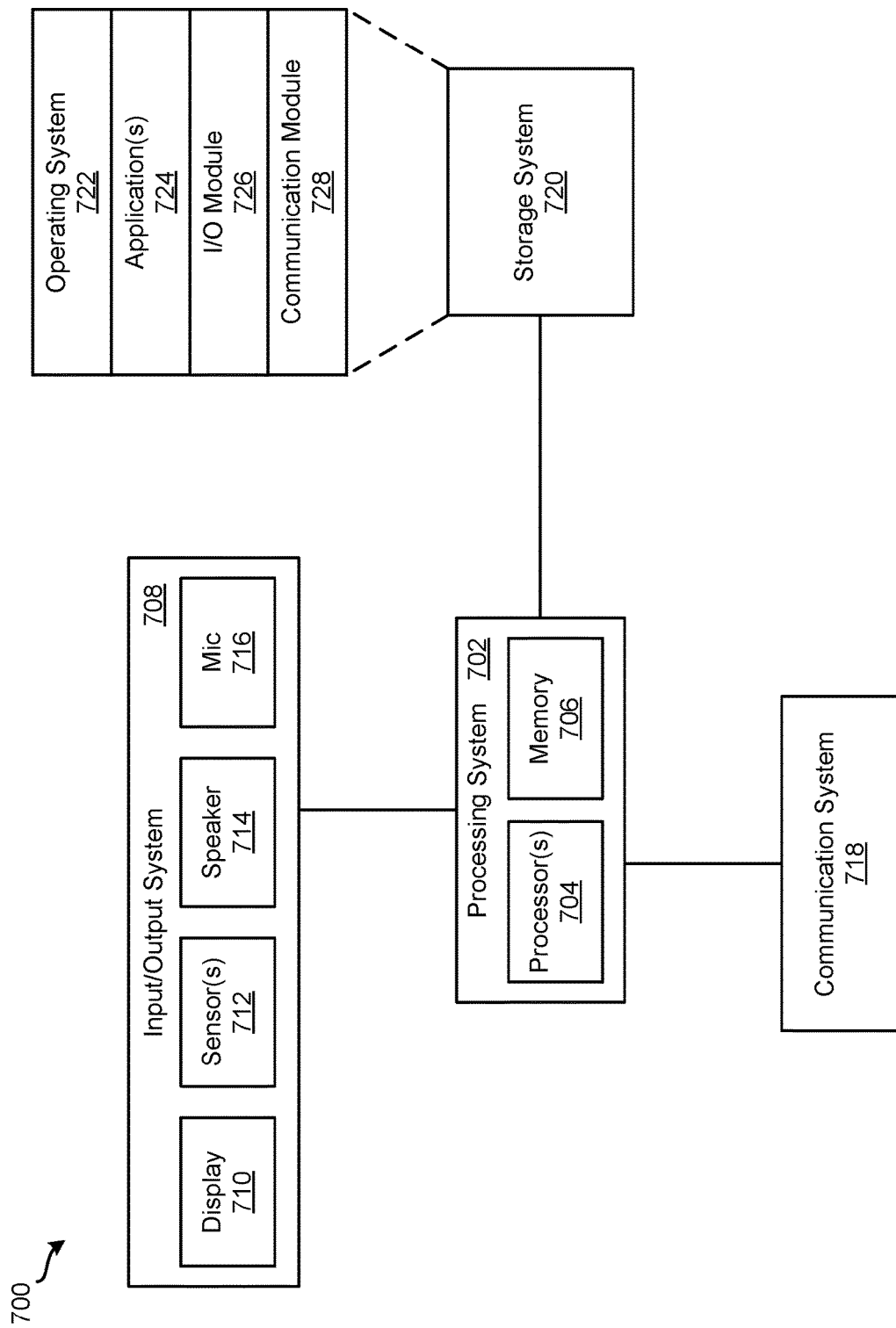
FIG. 7 illustrates an exemplary computing device, in which various embodiments may be implemented.

FIG. 7 illustrates an exemplary computing device 700 for implementing various embodiments described above. For example, computing device 700 may be used to implement mobile device 105 and client device 140. Computing device 700 may be a cellphone, a smartphone, a wearable device, an activity tracker or manager, a tablet, a personal digital assistant (PDA), a media player, or any other type of mobile computing device or combination thereof. Some or all elements of application 110, web browser 145, or combinations thereof can be included or implemented in computing device 700. In addition, computing device 700 can implement many of the operations, methods, and/or processes described above (e.g., process 300 and process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components (e.g., application 110 and browser 145) and/or processes (e.g., process 300 and process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. For example, application 110 may be installed on computing device 700. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
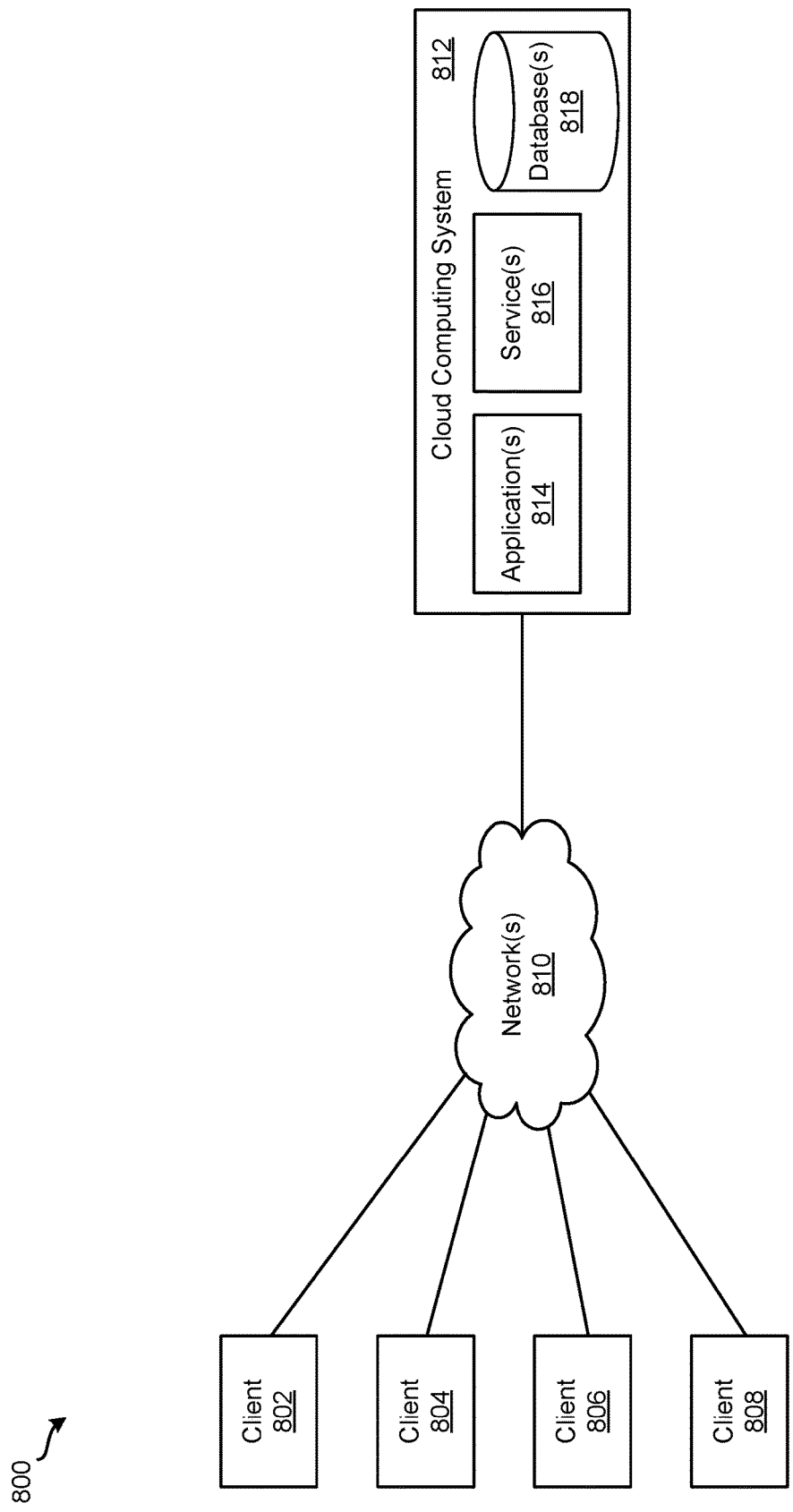
FIG. 8 illustrates an exemplary system, in which various embodiments may be implemented.

FIG. 8 illustrates an exemplary system 800 for implementing various embodiments described above. For example, cloud computing system 812 may be used to implement computing system 150, one of client devices 802-808 may be used to implement mobile device 105, and one of client devices 802-808 may be used to implement client device 140. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, data storage 165 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a mobile device, the program comprising sets of instructions for:
receiving through an application operating on the mobile device a request for a set of visualizations of data;
determining a version identifier of application resources to use for generating the set of visualizations of data by obtaining the version identifier that is being used by a computing device;
based on the version identifier of the application resources, determining whether a set of application resources included in the application has the version identifier;
upon determining that the set of application resources included in the application has the version identifier, using the set of application resources to generate the set of visualizations of data; and
upon determining that the set of application resources included in the application does not have the version identifier, determining that the set of application resources included in the application is capable of being used for generating the set of visualizations of data and using the set of application resources included in the application to generate the set of visualizations of data, and while using the set of application resources included in the application, retrieving the set of application resources having the version identifier from a computing system, wherein the retrieved set of application resources having the version identifier is usable to generate another instance of the set of visualizations of data responsive to a later request for the set of visualizations of data.

2. The non-transitory machine-readable medium of claim 1, wherein the application is a first application, wherein the computing system is a first computing system, wherein determining the version identifier of the application resources comprises sending a second computing system a request for the version identifier of the application resources and receiving the version identifier of the application resources from the second computing system, wherein the second computing system comprises a second application and application resources having the version identifier that are configured to generate visualizations of data on a client computing device accessing the second application through a web browser operating on the client computing device.

3. The non-transitory machine-readable medium of claim 1, wherein determining that the set of application resources included with the application has the version identifier comprises selecting the set of application resources from a plurality of sets of application resources included with the application, each set of application resources in the plurality of sets of application resources having a different version identifier.

4. The non-transitory machine-readable medium of claim 1, wherein the set of visualizations of data are defined as a collection of visualizations of data, wherein receiving the request for the set of visualizations of data comprises receiving a selection of a UI element provided by the application, the UI element representing the defined collection of visualizations of data.

5. The non-transitory machine-readable medium of claim 1, wherein the program further comprises a set of instructions for receiving a request for the set of application resources from a webview object, wherein determining the version identifier of application resources is performed in response to receiving the request for the set of application resources from the webview object.

6. The non-transitory machine-readable medium of claim 5, wherein the computing system is a first computing system, wherein generating a visualization of data in the set of visualizations of data comprises the webview object sending a second computing system a request for data for the visualization of data; receiving the data from the computing system; and generating the visualization of data based on the received data.

7. The non-transitory machine-readable medium of claim 1, wherein the request for the set of visualizations of data is the first request received through the application after the application is started.

8. A method, executable by a mobile device, comprising:
receiving through an application operating on the mobile device a request for a set of visualizations of data;
determining a version identifier of application resources to use for generating the set of visualizations of data by obtaining the version identifier that is being used by a computing device;
based on the version identifier of the application resources, determining whether a set of application resources included in the application has the version identifier;
upon determining that the set of application resources included in the application has the version identifier, using the set of application resources to generate the set of visualizations of data; and
upon determining that the set of application resources included in the application does not have the version identifier,
determining that the set of application resources included in the application is capable of being used for generating the set of visualizations of data and using the set of application resources included in the application to generate the set of visualizations of data, and
while using the set of application resources included in the application, retrieving the set of application resources having the version identifier from a computing system, wherein the retrieved set of application resources having the version identifier is usable to generate another instance of the set of visualizations of data responsive to a later request for the set of visualizations of data.

9. The method of claim 8, wherein the application is a first application, wherein the computing system is a first computing system, wherein determining the version identifier of the application resources comprises sending a second computing system a request for the version identifier of the application resources and receiving the version identifier of the application resources from the second computing system, wherein the second computing system comprises a second application and application resources having the version identifier that are configured to generate visualizations of data on a client computing device accessing the second application through a web browser operating on the client computing device.

10. The method of claim 8, wherein determining that the set of application resources included with the application has the version identifier comprises selecting the set of application resources from a plurality of sets of application resources included with the application, each set of application resources in the plurality of sets of application resources having a different version identifier.

11. The method of claim 8, wherein the set of visualizations of data are defined as a collection of visualizations of data, wherein receiving the request for the set of visualizations of data comprises receiving a selection of a UI element provided by the application, the UI element representing the defined collection of visualizations of data.

12. The method of claim 8 further comprising receiving a request for the set of application resources from a webview object, wherein determining the version identifier of application resources is performed in response to receiving the request for the set of application resources from the webview object.

13. The method of claim 12, wherein the computing system is a first computing system, wherein generating a visualization of data in the set of visualizations of data comprises the webview object sending a second computing system a request for data for the visualization of data;

receiving the data from the computing system; and generating the visualization of data based on the received data.

14. The method of claim 8, wherein the request for the set of visualizations of data is the first request received through the application after the application is started.

15. A mobile system comprising:
a set of processing units; and
a non-transitory machine-readable medium storing instructions that when executed by at least one processing unit in the set of processing units cause the at least one processing unit to:
receive through an application operating on the mobile system a request for a set of visualizations of data;
determine a version identifier of application resources to use for generating the set of visualizations of data by obtaining the version identifier that is being used by a computing system;
based on the version identifier of application resources, determine whether a set of application resources included in the application has the version identifier;
upon determining that the set of application resources included in the application has the version identifier, use the set of application resources to generate the set of visualizations of data; and
upon determining that the set of application resources included in the application does not have the version identifier,
determining that the set of application resources included in the application is capable of being used for generating the set of visualizations of data and using the set of application resources included in the application to generate the set of visualizations of data, and
while using the set of application resources included in the application, retrieve the set of application resources having the version identifier from a computing system, wherein the retrieved set of application resources having the version identifier is usable to generate another instance of the set of visualizations of data responsive to a later request for the set of visualizations of data.

16. The system of claim 15, wherein the application is a first application, wherein the computing system is a first computing system, wherein determining the version identifier of the application resources comprises sending a second computing system a request for the version identifier of the application resources and receiving the version identifier of the application resources from the second computing system, wherein the second computing system comprises a second application and application resources having the version identifier that are configured to generate visualizations of data on a client computing device accessing the second application through a web browser operating on the client computing device.

17. The system of claim 15, wherein determining that the set of application resources included with the application has the version identifier comprises selecting the set of application resources from a plurality of sets of application resources included with the application, each set of application resources in the plurality of sets of application resources having a different version identifier.

18. The system of claim 15, wherein the set of visualizations of data are defined as a collection of visualizations of data, wherein receiving the request for the set of visualizations of data comprises receiving a selection of a UI element provided by the application, the UI element representing the defined collection of visualizations of data.

19. The system of claim 15, wherein the instructions further cause the at least one processing unit to receive a request for the set of application resources from a webview object, wherein determining the version identifier of application resources is performed in response to receiving the request for the set of application resources from the webview object.

20. The system of claim 19, wherein the computing system is a first computing system, wherein generating a visualization of data in the set of visualizations of data comprises the webview object sending a second computing system a request for data for the visualization of data; receiving the data from the computing system; and generating the visualization of data based on the received data.

* * * * *